INVENTOR
YOSHICHIKA SAKAMOTO
BY
ATTORNEY

Nov. 5, 1968  YOSHICHIKA SAKAMOTO  3,409,352
DEVICE FOR PROJECTING PHOTOGRAPHIC SLIDES HELD
BY A RECTANGULAR FILING PLATE FRAME
Original Filed June 18, 1965  2 Sheets-Sheet 2
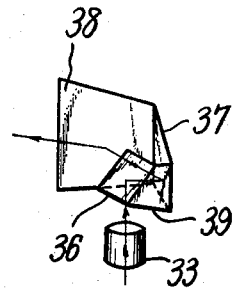
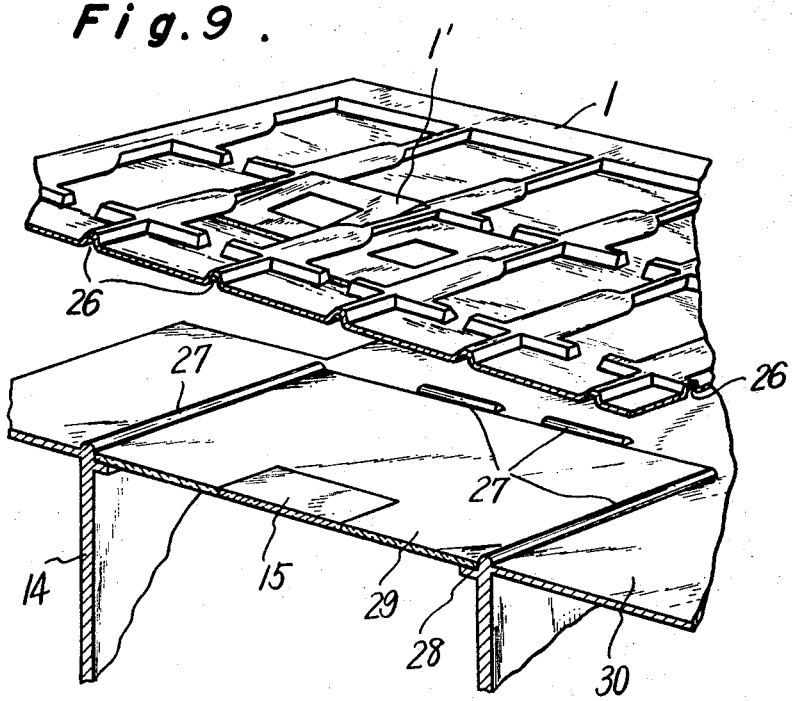
INVENTOR
YOSHICHIKA SAKAMOTO
BY
ATTORNEY

United States Patent Office 3,409,352
Patented Nov. 5, 1968

3,409,352
DEVICE FOR PROJECTING PHOTOGRAPHIC SLIDES HELD BY A RECTANGULAR FILING PLATE FRAME
Yoshichika Sakamoto, 214 2-chome, Sengen-cho, Ohmiya, Japan
Original application June 18, 1965, Ser. No. 465,040. Divided and this application Aug. 31, 1967, Ser. No. 671,909
Claims priority, application Japan, Feb. 15, 1965, 40/8,219
3 Claims. (Cl. 353—25)

ABSTRACT OF THE DISCLOSURE

A device for projecting film slides comprises a housing having a projection window in its top, and a light source and condenser lenses in the housing for directing light upwardly through the window, in combination with projection lenses and mirrors above the window for directing the light onto a screen. A rectangular filing plate frame in and from which film slides to be viewed are individually insertable and removable in a plurality of rows has recesses on its underside, and the housing top has corresponding projections that fit into the recesses to register any selected slide precisely with the window. A translucent viewing screen within the device receives the image from a mirror, and that mirror is vertically swingable to an inoperative position to permit projection of the image alternatively on a wall screen.

---

This application is a division of my copending application Ser. No. 465,040, filed June 18, 1965, now abandoned.

This invention relates to a device for directly projecting a photographic slide, more particularly color film slides as filed in a partly translucent filing plate frame of a number of color films.

The convenience in using rectangular plate frames for filing a number of color film slides has been recognized recently and such filing plate frames have been used widely.

Said filing plate frame is usually made of synthetic resin sheet or thick paper board by die molding or shaping into rectangular form and provided with a number of rectangular recesses to file and hold photographic slides in a lattice disposition one in each recess, whereby slides can be kept in good order, handled and checked easily and selected and viewed conveniently. Furthermore, a number of such filing plate frames may be bound together for use as an album with great advantage to keep slides in good order.

However, the conventional practice of projecting film slides kept in said filing plate frame has been to select and take off the slides one by one from said recesses of the filing plate frame and such slides must be returned to respective recesses again one by one after projection is finished, which was a rather troublesome procedure in projecting film slides.

The principal object of the invention is to obviate said troublesome procedure by providing a device capable of projecting any slide as held in a filing plate frame and thereby to simplify the projecting procedure.

Another object of the invention is to provide a simplified procedure for selecting a desired slide out of a number of slides held in said filing plate frame.

A still further object of the invention is to provide a projecting device having means to simultaneously illuminate all photographic slides held by the filing plate frame for enabling proper selection of a desired slide with ease while keeping the ability of producing a clear projected image of the selected slide, whereby it is made possible to review all contents of said slide filing plate frame while projecting a certain slide therein and thus lectures using slides are considerably simplified.

Yet another object of the present invention is the provision of such a projecting device, in which individual slides in a filing plate frame can be easily and accurately registered with the light source.

The invention also contemplates the provision of a projecting device in which the image can be viewed alternatively on a relatively small screen within the device or a relatively large screen outside the device.

The projecting device of the invention is characterized in that a rectangular filing plate frame holding a number of slides in a lattice disposition is inserted and held in said projecting device between a group of condenser lenses and a projecting lens in such a manner that said filing plate frame can be shifted in two directions crossing with each other at a right angle to facilitate selection and projection of any slide therein as it is held in said filing plate frame.

For a better understanding of the invention reference is made to the accompanying drawings, in which FIGS. 1 and 2 are a side view and a rear view, respectively, of one embodiment of the invention;

FIG. 8 is a diagrammatic perspective view illustrating the assembly of a group of reflecting mirrors; and FIG. 9 is an enlarged fragmentary perspective view of a portion of the apparatus shown in FIGS. 1 and 2.

Figure 1:
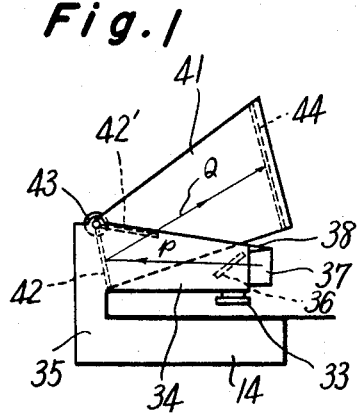

Referring now to the drawings in greater detail, there is shown a rectangular filing plate frame 1, best seen in FIG. 9, having a number of slide-receiving pockets in a lattice disposition, 1' being an individual film slide to be held in a said pocket, with one film slide disposed in each pocket. The flat panels of the filing plate frame are translucent, although it will be understood that it is permissible to provide a suitable window in each recess so that the projector light beam may be directed directly through photographic slides without passing through a translucent panel of the filing plate frame.

Figure 3:
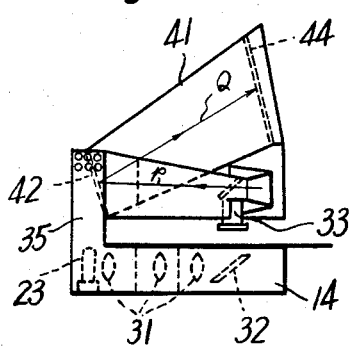
FIGS. 3, 4 and 5 are a side view, a rear view, and a plan view, respectively, of another embodiment of the invention.
Figure 5:
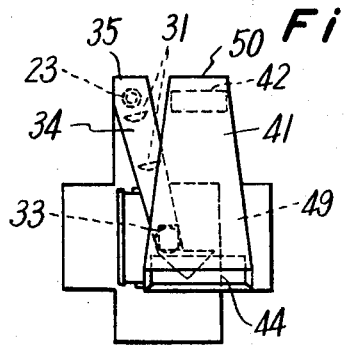

The projector also comprises a housing 14 for the light source system of the slide projector, having a horizontal light source window 15. A light source lamp is indicated at 23, as best seen in FIGS. 3 and 5, and a group of condenser lenses 31 are placed opposite to the light source lamp 23. A reflecting mirror 32 reflects the horizontal light flux from condenser lenses 31 vertically upward to and through the light source window 15.

As best seen in FIG. 9, linear projections 27 engage with the grooves 26 of filing plate frame 1 due to the formation of frame 1 as a lattice. Projections 27 are provided on the top of housing 14 of the light source system at a pitch equivalent to multiples of that of said lattice, which is to say spaced apart a whole-number multiple of the size of the slide pockets, in order to hold the filing plate frame 1 rigidly. A milk-white translucent plate 29 mounts the light source window 15 therein and is supported by the inner edges 28 of the straight projections 27. In addition, a table board 30 is provided surrounding translucent plate 29. Window 15 is on the same level as table board 30.

A projection lens 33 is located in opposition to the light source window 15. Lens 33 is disposed in a cylinder depending from a supporting arm 34 extending from housing 14 by way of a vertical supporting arm 35. Each of said arms 34 and 35 is hollow and serves as a radiator of heat generated by the light source lamp 23.

A mirror 36 is placed directly above the projection lens 33 with an inclination of 45 degrees with respect to a vertical plane parallel to the screen or surface on which the image is to be projected, in order to reflect the generally vertical light flux from the projection lens 33. In addition, mirrors 37 and 38 are so placed as to reflect said light flux from the mirror 36 toward the exterior screen (not shown), that is, the general direction of the light flux from the mirror 36 is reversed about 180 degrees to proceed approximately horizontally toward the external screen when leaving the mirror 38. In FIG. 8, a supporting plate 39 secures mirrors 36 and 37 in proper mutual relationship and mounts the group of mirrors 36, 37 and 38 on the supporting arm 34 by mounting means (not shown).

It it thus apparent that the light beam from the projection lens 33 after passing through the slide 1' is reflected by means of said series of mirrors 36, 37, 38 and projected passing by the supporting arm 34 and along the path p, p to produce the image of the desired slide on the external screen. The light coming through the translucent plate 29 illuminates all the slide pictures in the filing plate frame 1 placed on the horizontal table board 30 to enable the operator to have a direct view of said pictures from the back of the projecting device for the purpose of careful review in the course of lecturing or explaining. Said illumination also helps to make proper selection of the desired picture. The selection of the desired picture is made by shifting said filing plate frame 1 horizontally and by engaging grooves 26 of the filing plate frame with linear projections 27 on top of the housing 14, thereby bringing a desired slide to a position directly above the light source window 15.

According to the above-explained construction of the slide projector of the invention, the operator can see the pictures in the plate frame other than that which is projected on the screen at each moment, and thus he can make a speech on many more related pictures than in the case of using a conventional projector.

Figure 2:
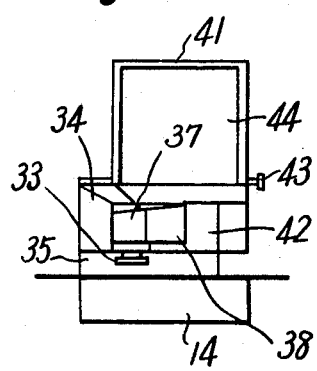

As best seen in FIGS. 1 and 2, a screen housing 41 is mounted on the vertical arm 35 of the slide projector. With screen housing 41, the operator may see the picture prior to projection, and he can show the picture to a small audience on a small scale. To this end, an additional mirror 42 is pivoted on a horizontal axis 43 and interrupts the light beam at a point between the mirror 38 and the external screen and changes the direction of the light beam from the path p to the path Q as shown in FIGS. 1 and 3, to produce the image of the desired slide on the screen 44. When said additional mirror 42 is swung and kept in the position 42' shown in FIG. 1 by rotating mirror 42 about axis 43, the slide picture can again be projected on the external screen.

Figure 4:
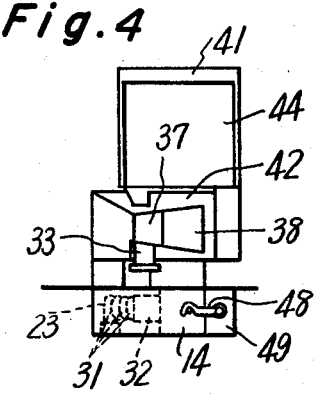
Figure 6:
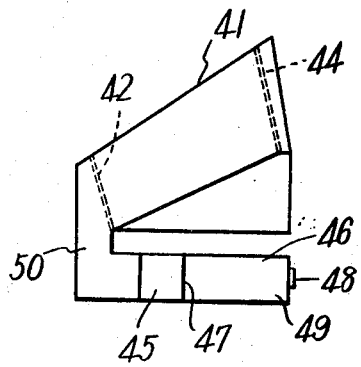
FIGS. 6 and 7 are a side view and a plan view, respectively, of a screen box for use with the embodiment of FIGS. 3–5.
Figure 7:
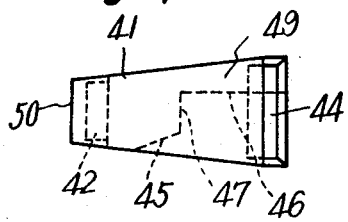

FIGS. 3 to 5 show another embodiment of the invention using a removable screen housing, and FIGS. 6 and 7 show the removable screen housing proper.

The screen housing 41 of the latter embodiment comprises a series of bent side surfaces 45, 46 and 47 formed along the shape of the housing 14 of the light source system, a base 49 having a hook 48 to connect two housings 14 and 41, a connector 50 extending upward from the rear portion of said base 49 approximately parallel to said vertical supporting arm 35 of said housing 14 of the light source system, and a fixed reflecting mirror 42 mounted on the front portion of said connector 50. The light beam of the slide picture is bent from the path p to the path Q by means of the reflecting mirror 42 to produce the image of the picture on the screen 44 according to the same principle as in the preceding embodiment.

It is preferable in this latter embodiment to make the surface of the housing 14 of the light source system that contacts the base 19 coincide with the bent surfaces 45, 46 and 47.

As described in the foregoing, the device of the invention provides means to select and project a slide as held in the rectangular filing plate frame holding a number of slides in a lattice disposition by moving said filing plate frame in two directions crossing each other at a right angle, and thus improves the slide projection techniques greatly while keeping all advantages of the slide filing plate frame system.

It will therefore be apparent that all of the initially recited objects of the present invention have been achieved.

Although the present invention has been described and illustrated in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

Having described my invention, I claim:

1. A device for projecting film slides, comprising a housing having a horizontal top, a projection window disposed in said horizontal top, a light source and condenser lenses in said housing for projecting light up through said window, a filing plate frame having a plurality of pockets for holding a plurality of film slides in a plurality of rows, said horizontal top having upwardly extending projections spaced apart a whole-number multiple of the size of the slide pockets, said filing plate frame having downwardly opening recesses between said slide pockets for receiving said upwardly extending projections on the top of the housing, thereby accurately to locate a selected slide with respect to said window.

2. A device as claimed in claim 1, said top of said housing between said upwardly extending projections being comprised by a translucent plate in which said window is set.

3. A device as claimed in claim 1, said projections and said recesses being elongated with some of said projections disposed perpendicular to others of said projections and some of said recesses disposed perpendicular to others of said recesses.

References Cited

UNITED STATES PATENTS

| 2,361,398 | 10/1944 | Harris et al. | 88—24 |
| 2,439,987 | 4/1948 | Roger | 88—24 |
| 2,624,231 | 1/1953 | Kingston | 88—24 |
| 3,242,803 | 3/1966 | Dine et al. | 88—26 |

NORTON ANSHER, *Primary Examiner.*

R. M. SHEER, *Assistant Examiner.*